United States Patent
Stählin

(10) Patent No.: US 10,986,477 B1
(45) Date of Patent: Apr. 20, 2021

(54) VEHICLE-TO-X COMMUNICATION AND PROCEDURES DEVICE

(71) Applicant: Continental Automotive Systems, Inc., Auburn Hills, MI (US)

(72) Inventor: Ulrich Stählin, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/585,649

(22) Filed: Sep. 27, 2019

(51) Int. Cl.
*H04W 4/40* (2018.01)
*H04W 12/02* (2009.01)
*H04W 12/06* (2021.01)
*H04W 4/06* (2009.01)

(52) U.S. Cl.
CPC .............. *H04W 4/40* (2018.02); *H04W 4/06* (2013.01); *H04W 12/02* (2013.01); *H04W 12/0609* (2019.01)

(58) Field of Classification Search
CPC ..... H04W 4/40; H04W 4/06; H04W 12/0609; H04W 12/02; H04W 4/029; H04W 12/0602; H04W 4/021; H04W 4/44; H04W 4/80; H04W 64/006
USPC ......................................................... 455/3.01
See application file for complete search history.

(56) References Cited

U.S. PATENT DOCUMENTS

2020/0084738 A1* 3/2020 Nguyen .............. H04W 64/003

* cited by examiner

*Primary Examiner* — Shaima Q Aminzay
(74) *Attorney, Agent, or Firm* — RatnerPrestia

(57) ABSTRACT

A device for vehicle-to-X (V2X) communication, including a computing apparatus for data processing and a generating apparatus for generating vehicle-to-X messages by a protocol stack. The computing apparatus is configured to forecast an anticipated event triggering the broadcasting of a V2X message and to produce data forecast on the basis of the anticipated event and to provide the same to the generating apparatus for generating a forecast vehicle-to-X message. A corresponding method as well as the use of the device in a vehicle is also disclosed.

11 Claims, 2 Drawing Sheets

VEHICLE-TO-X COMMUNICATION AND PROCEDURES DEVICE

FIELD OF THE INVENTION

The present invention relates to a device for vehicle-to-X communication, a corresponding method as well as the use of the device in a vehicle.

BACKGROUND OF THE INVENTION

Vehicle-to-X (V2X) systems have to meet requirements in respect of a latency time of the broadcast of a V2X message, for example after the occurrence or detection of an event or a change in state of a vehicle. All V2X messages to be broadcast must be signed using a certificate, a so-called pseudonym certificate, such that a receiver of the message can check the authenticity of the sender without the privacy of the sender being affected. The most frequent implementations of corresponding algorithms for signing already require a large part of the overall maximum permitted latency time. Furthermore, the V2X messages are usually signed in order of their planned broadcast, which however in the case of event-based V2X messages can result in extended latency times if one or more V2X messages are already waiting to be signed. For example, a case can occur if a message of a message type (e.g. "BSM" or "CAM") to be broadcast periodically has just been signed and an event occurs immediately which triggers the broadcast of a message of a different message type (e.g. "enhanced BSM" or "DENM"). Compliance with the required maximum latency time for the event-triggered message proves particularly difficult in such cases.

In order to meet the requirements in respect of the latency times with which compliance needs to be achieved, the signing apparatuses are usually equipped with very extensive computing resources which are intended to ensure compliance in every case.

SUMMARY OF THE INVENTION

An aspect of the invention is a means which make possible reduced outlay on resources while safely complying with the requirements in terms of latency times for transmitting V2X messages.

An aspect of the invention describes a device for vehicle-to-X (V2X) communication, comprising a computing apparatus for data processing and a generating apparatus for generating vehicle-to-X messages by means of a protocol stack, wherein the computing apparatus is configured to forecast an anticipated event triggering the broadcasting of a V2X message and to produce data forecast on the basis of the forecast event and to provide same to the generating apparatus for generating a forecast vehicle-to-X message.

In principle, it is not possible to add message contents of a message to be broadcast, which are intended to be taken into consideration by signing, after signing has taken place. If, for example, a time stamp is added to the message after it has been signed, in order to maintain its broadcast time in the message, this is not taken into consideration by the signature and accordingly cannot be verified by a receiver using the signature. For a V2X message which does not begin to be generated until an event occurs, it may not be possible to ensure a broadcast within the framework of latency requirements for the smallest possible intended outlay on resources for message processing, in particular signing. Thus, the concept forming the basis of an aspect of the invention is to achieve a reduced outlay on resources while simultaneously ensuring compliance with the requirements for latency times in that forecast V2X messages for describing a forecast or anticipated or potentially occurring event are generated, in which at least one part of the data fields is filled with forecast data, regardless of the circumstance of whether properly ascertained relevant data actually currently being broadcast are provided by the computing apparatus for generating a V2X message to be broadcast. By a forecast V2X message is thus meant a V2X message which is generated regardless of, or without the presence of, an event actually triggering a relevant V2X message, and the information available in conjunction therewith, and which plays back an event anticipated to be occurring, at least at the time the forecast V2X message is starting to be generated. The forecast V2X messages can thus be generated chronologically regardless of usually used triggers and information, in particular the presence of real data or values usually to be detected for the message contents. Correspondingly, generation can take place by means of the V2X message of the protocol stack, chronologically before the actual occurrence or detection of a relevant event.

The usual sequential processing of V2X messages to be signed and broadcast can, as a result, be made more efficient. Considerable cost savings on resources to be provided while simultaneously potentially meeting the latency requirements can thus be achieved by an aspect of the invention. From a current perspective, an aspect of the invention could actually represent the only possibility to provide a commercially achievable solution, as many at least currently available security units which are suitable to be used to sign V2X messages to be broadcast, in particular from a design point of view and in respect of the costs, are conceived for much lower signing numbers per unit of time. Means are thus provided by an aspect of the invention making possible a reduced outlay on resources while safely complying with the requirements in terms of latency times for transmitting V2X messages upon occurrence or detection of an event.

According to an embodiment, the device has a signing apparatus for signing V2X messages to be broadcast. A V2X message produced by means of the protocol stack can thus be signed and immediately broadcast by means of the broadcasting apparatus. In particular, signing takes place using a certificate, in particular a pseudonym certificate, whereby a receiver of the message can check the authenticity of the sender without the privacy of the sender being affected. According to a development, the computing apparatus and/or the signing apparatus and/or the generating apparatus can be produced by means of a common integrated circuit and/or computing unit.

According to an embodiment, the device comprises a broadcasting apparatus for broadcasting V2X messages by means of an antenna. The forecast V2X messages can likewise be broadcast by means of broadcasting apparatus.

A computing apparatus or processing unit can be any apparatus which is designed to process at least one of the named signals. For example, the computing apparatus or processing unit can be a processor, an ASIC, an FGPA, a digital signal processor, a main processor ("central processing unit" (CPU)), a multi-purpose processor (MPP) or the like.

According to an embodiment, the device is configured not to broadcast the forecast V2X message if the forecast event does not actually occur. According to a development, in this case, the forecast V2X message can be discarded.

According to an embodiment, the device is then configured to broadcast the forecast V2X message only if the forecast event actually occurs.

According to an embodiment, the device is configured to sign the forecast V2X message by means of the signing apparatus and then to not broadcast the signed forecast V2X message if the forecast event does not actually occur. Expediently, the signed forecast V2X message is then broadcast only if the forecast event actually occurs.

According to a development, the device is configured not to sign the forecast V2X message by means of the signing apparatus if the forecast event does not actually occur. According to a development, in this case, the forecast V2X message can be discarded, whereby no further time for signing is produced by the forecast V2X message.

According to a development, the device is then configured to sign the forecast V2X message by means of the signing apparatus only if the forecast event actually occurs.

The above-named checks as to whether or not the event has actually occurred can take place within the framework of an aspect of the invention, before and/or after signing. If the check takes place before signing, it is in particular not possible to avoid additional effort for signing V2X messages to be broadcast. If the check takes place after signing, this extra time in particular in favor of meeting the latency requirements is accepted.

According to an embodiment, the forecast V2X message is generated for an event most likely to occur in each case. Expediently, the device is configured to ascertain the event most likely to occur in each case by means of the computing apparatus. According to a development, information about a speed of the vehicle, a number of road users in the vicinity of the vehicle and/or a type of vehicle is used to select the event most likely to occur. Alternatively, or additionally, the forecast V2X messages can describe an always identical event which is generally accepted to be the most likely or is the most useful given a particularly short latency time. This can, for example, be braking over a specific threshold value or activating the braking lights.

According to a development, the forecast V2X message defines an event-triggered message type. Event-related message types of this type relate to V2X messages which, unlike periodically broadcast V2X messages, require a triggering event. A triggering event can in this case e.g. be an accident or a vehicle in front applying the brakes. Event-triggered V2X messages are, for example, so-called "enhanced BSM" or "DENM". In other words, a relevant anticipated occurring event within the meaning of an event-triggered message type as well as its underlying information which form the data content of the message, is predicted with the forecast event.

Alternatively, or additionally to this, the forecast V2X message can define a message type to be broadcast periodically. In other words, the occurrence of a trigger mechanism for triggering generation as well as broadcasting of a V2X message of a message type to be broadcast periodically as well as its underlying information which form the data content of the message is predicted with the forecast event. This relates in particular to message types to be broadcast periodically, such as, for example, BSM ("basic safety message") or CAM ("cooperative awareness message"). This is then advantageous in particular if it is to be expected that a plurality of messages to be broadcast emerge and/or a plurality of different message types to be broadcast periodically emerge which are also intended to be broadcast consecutively. The trigger mechanisms as well as contents of the messages to be broadcast can thus be forecast with greater chronological independence. Such cases can, for example, be expected for roadside units or for infrastructure apparatuses designed for vehicle-to-X communication.

According to an embodiment, the device is configured to add to the forecast V2X message at least one time stamp for playing back a forecast time of producing the forecast V2X message and/or a forecast time of producing the forecast data and/or a forecast time following the signing, in particular substantially directly before sending, and/or a forecast time of the anticipated event.

Usually, a V2X message to be broadcast comprises at least one time stamp. A current time for producing a respective time stamp in the respective processing stage of the V2X message to be broadcast is ascertained with a corresponding time-detecting apparatus. Frequently, a current system time is updated using time information obtained by means of a GNSS system. A different number of time stamps can be added to the respective V2X messages. The same can also apply in particular to V2X messages to be generated, which likewise run through the generating pipeline. For example, different levels of the protocol stack can each supplement a time stamp, wherein a more efficient use of resources can be taken into consideration when establishing whether or not a time stamp is intended to be added. A respective time stamp is produced in particular by the generating apparatus or by means of the protocol stack within the framework of generating the forecast V2X message, and added to the forecast V2X message.

At the time of forecasting the event, it is possible only to forecast the actual time of the event. Thus, in addition to the data, in particular likewise a time or occurrence of the event is forecast. Therefore, the time stamp can also comprise a time stamp forecast in such a way.

According to an embodiment, the device is configured to generate the forecast V2X message directly following the generation of a V2X message of a message type usually broadcast periodically, or to forecast a time for same. Generating a V2X message with a message type usually to be broadcast periodically thus serves as a trigger for generating a forecast V2X message. According to a development, at least one time stamp, which corresponds to an immediately subsequent broadcast of the forecast message of the V2X message of the message type to be broadcast periodically, is thus added to the forecast V2X message.

According to an embodiment, the computing apparatus is configured to produce confidence information in respect of at least a part of the forecast data and provide the confidence information with the forecast data to the message-generating apparatus for generating the forecast vehicle-to-X message. As the produced data relate to forecasts, it is usually to be expected that the forecast data display less accuracy than, for example, the data actually present with the actual occurrence of the forecast event. The confidence information can thus be used by a receiver of the forecast V2X message to evaluate the forecast data.

Furthermore, an aspect of the invention relates to a method for vehicle-to-X communication, wherein by means of a computing apparatus for data processing, an anticipated event triggering the broadcasting of a V2X message is forecast and forecast data are produced on the basis of the forecast event, and a forecast vehicle-to-X message is generated using the forecast data by means of a generating apparatus. Developing embodiments of the method result in transferable manner from the embodiments of the device for vehicle-to-X communication. Further embodiments of the method result in transferable manner from the description of the respective embodiments of the device according to an aspect of the invention.

In a development of the stated device, the indicated device has a memory and a processor. In so doing, the indicated method is stored in the memory in the form of a computer program and the processor is provided to carry out the method if the computer program is loaded from the memory into the processor.

According to a further aspect of the invention, a computer program comprises program code means to carry out all steps of one of the indicated methods if the computer program is carried out on a computer or one of the indicated devices.

According to a further aspect of the invention, a computer program product contains a program code which is stored on a computer-readable data carrier and which, when carried out on a data-processing device, carries out one of the indicated methods.

An aspect of the invention further relates to the use of the device in a vehicle.

The vehicle can be a motor vehicle, in particular a passenger car, a commercial vehicle, a motorcycle, an electronic car or a hybrid car, a water vehicle or an aircraft.

BRIEF DESCRIPTION OF THE DRAWINGS

Some particularly advantageous embodiments of aspects of the invention are indicated in the dependent claims. Further preferred embodiments also result from the subsequent description of embodiment examples using Figures.

In schematic representation.

DETAILED DESCRIPTION OF THE PREFERRED EMBODIMENTS

Figure 1:
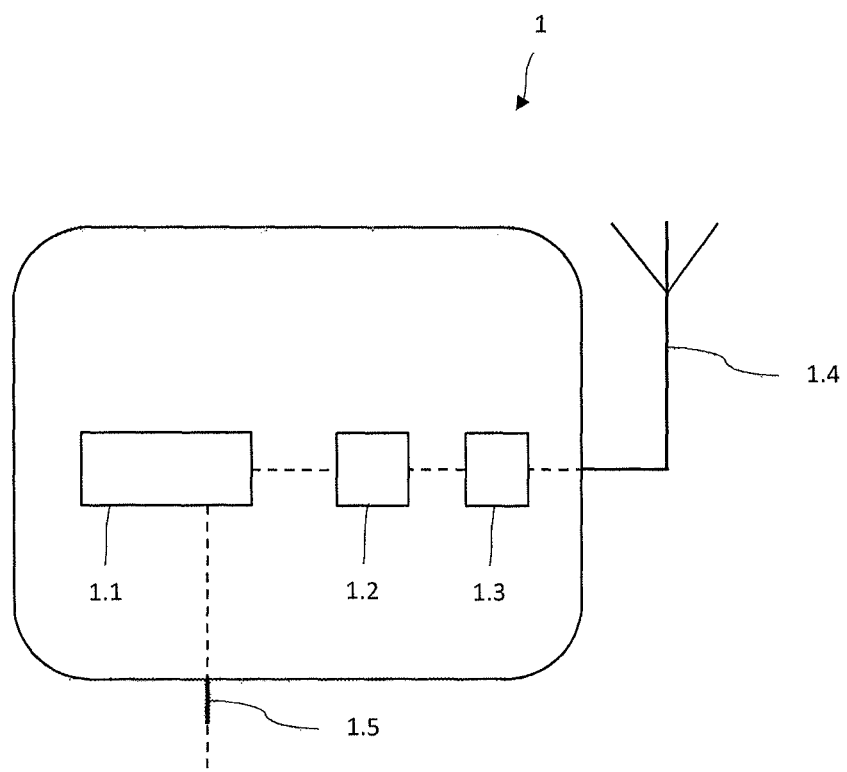
FIG. 1 shows an embodiment example of the device for vehicle-to-X communication according to an aspect of the invention and FIG. 2 shows an embodiment example of the method for vehicle-to-X communication according an aspect of to the invention.

FIG. 1 shows an embodiment example of the device 1 for vehicle-to-X (V2X) communication, according to an aspect of the invention, comprising a computing apparatus 1.1 for data processing and a generating apparatus 1.2 for generating vehicle-to-X messages by means of a protocol stack, wherein the computing apparatus 1.1 is configured to forecast an anticipated event triggering the broadcasting of a V2X message and to produce data forecast on the basis of the anticipated event and to provide same to the generating apparatus for generating a forecast vehicle-to-X message. According to a development, the device 1 comprises a signing apparatus 1.3 for signing V2X messages to be broadcast. A V2X message produced by means of the generating apparatus 1.2 can thus be signed and furthermore broadcast by means of an antenna 1,4. The computing apparatus or the device 1 for data processing can be suitably connected to further electronic systems by means of a data processing means 1.5.

According to the embodiment example, the device is designed to undertake a check as to whether the forecast event has actually occurred and to only sign and/or broadcast the forecast V2X message if the result of the check displays the actual occurrence of the forecast event. If the forecast event does not occur, the forecast V2X message can, according to the example, be discarded.

Figure 2:
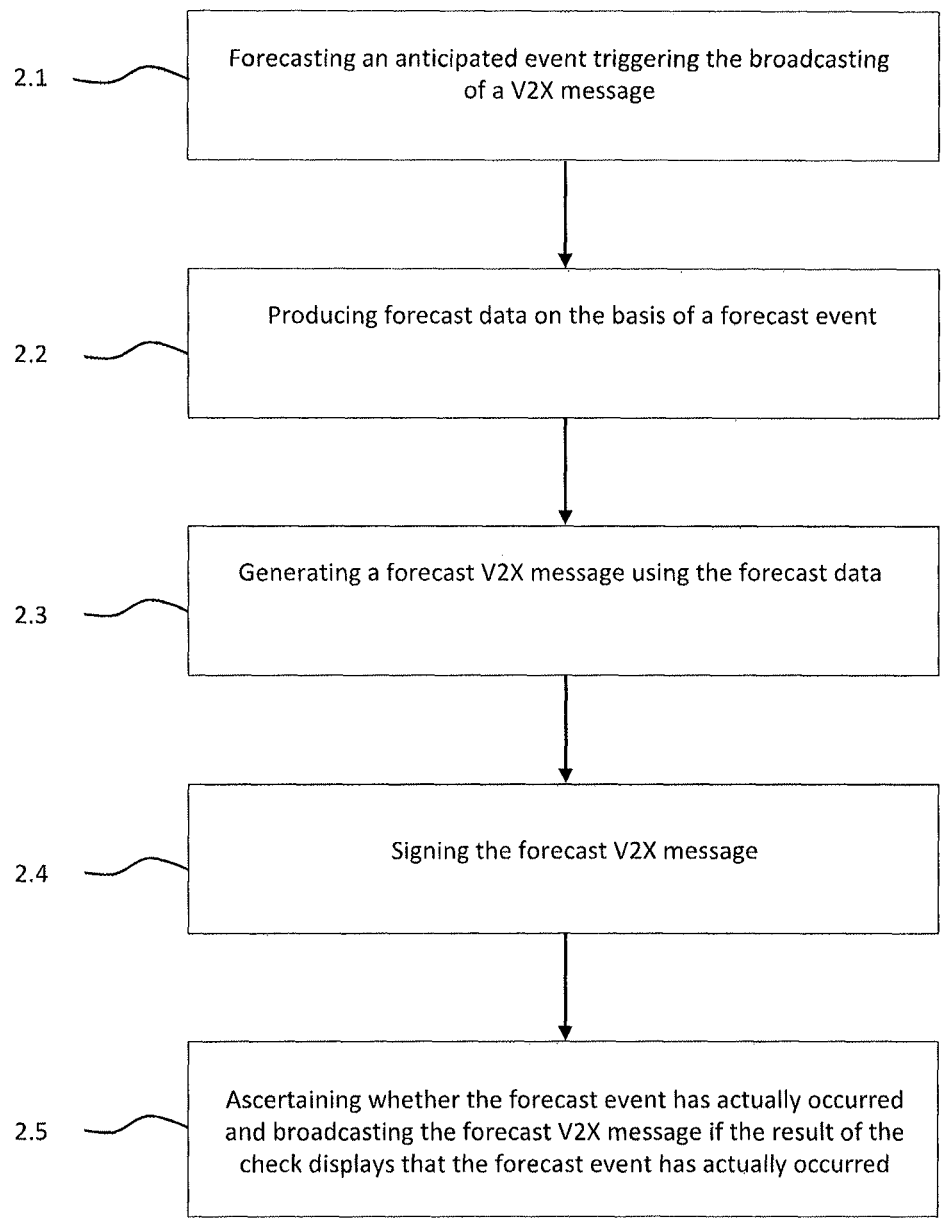

FIG. 2 shows, in the form of a flow chart, an embodiment example of the method for vehicle-to-X communication, wherein, in a step 2.1, by means of a computing apparatus for data processing, an anticipated event triggering the broadcasting of a V2X message is forecast and, in a step 2.2, forecast data are produced on the basis of the forecast event, and, in a step 2.3, a forecast vehicle-to-X message is generated using the forecast data by means of a generating apparatus. According to a development, in a step 2.4, it is provided to sign the forecast V2X message. In a step 2.5 it is checked whether the forecast event has actually occurred and the forecast message is then only broadcast if the result of the check displays that the forecast event has actually occurred. If the forecast event does not occur, the forecast V2X message is discarded according to an embodiment. According to this embodiment example, the forecast V2X message is signed before the check takes place as to whether the event has occurred. In a supplementary or alternative embodiment, the check can also take place before signing.

Should it be shown, in the course of the proceedings, that a feature or group of features is not absolutely necessary, then the applicant is intending a formulation of an independent claim which no longer has the feature or group of features. This may, for example, relate to a subdivision of a claim present on the date of application, or a subdivision of a claim present on the date of application which has been restricted by further features. Such claims or combinations of features which are to be reworded are to be understood as being covered by the disclosure of this application.

It should be further pointed out that embodiments, features and variants of aspects of the invention which are described in the different embodiments or embodiment examples or shown in the Figures may be combined with one another in any combination. Individual features or groups of features may be exchanged for one another as desired. Combinations of features resulting from this are to be understood as being covered by the disclosure of this application.

References in dependent claims are not to be understood to mean disclaimers of the achievement of an independent objective protection for the features of the dependent claims which have been referenced. These features can be combined with other features as desired.

Features which are disclosed only in the description or features which are disclosed in the description or in a claim only in connection with other features can in principle be of original meaning essential to an aspect of the invention. Therefore, they can be incorporated in the claims individually, distinct from the prior art.

Generally, it should be pointed out that vehicle-to-X communication is understood to mean in particular a direct communication between vehicles and/or between vehicles and infrastructure apparatuses. For example, this can be vehicle-to-vehicle communication or vehicle-to-infrastructure communication. Where reference is made within the scope of this application to communication between vehicles, this can in principle take place for example within the scope of a vehicle-to-vehicle communication, which takes place typically without being facilitated by a mobile communications network or a similar external infrastructure and which therefore is to be distinct from other solutions which, for example, are built on a mobile communications network. For example, a vehicle-to-X communication can take place using the standards IEEE 802.11p or IEEE 1609.4 or 4G or 5G, (all incorporated herein by reference), in particular also PC5 or "sidelink". Vehicle-to-X communication can also be called C2X communication or V2X communication. The subdivisions can also be called C2C (car-to-car), V2V (vehicle-to-vehicle), C2I (car-to-infrastructure) or V2I (vehicle-to-infrastructure). An aspect of the invention expressly includes vehicle-to-X communication with facilitation, for example, via a mobile communications network, so-called cellular-V2X or C-V2X.

The invention claimed is:

1. A device for vehicle-to-X (V2X) communication, comprising:
   a computing apparatus; and
   a generating apparatus for generating vehicle-to-X messages by a protocol stack,
   wherein the computing apparatus is configured to:
      predict an occurrence of an anticipated event that will trigger the broadcasting of data via a V2X message,
      in response to the prediction, and prior to the anticipated event occurring, provide the data to the generating apparatus, and
      not broadcast the V2X message if the anticipated event does not actually occur and/or broadcast the V2X message only when the anticipated event actually occurs.

2. The device according to claim 1, configured to generate the V2X message in respect of an event most likely to occur in each case and/or an event generally most likely to occur.

3. The device according to claim 2, configured to use information about a speed of the vehicle, a number of road users in the vicinity of the vehicle and/or a type of vehicle, in order to select the event most likely to occur.

4. The device according to claim 1, wherein the V2X message defines an event-triggered message type and/or a message type usually broadcast periodically.

5. The device according to claim 1, configured to add to the V2X message at least one time stamp for playing back an anticipated time of producing the V2X message and/or an anticipated time of producing the data and/or an anticipated time following the signing and/or an anticipated time of the anticipated event.

6. The device according to claim 1, configured to generate the V2X message directly following the generation of a V2X message of a message type usually broadcast periodically.

7. The device according to claim 1, wherein the computing apparatus is configured to produce confidence information in respect of at least a part of the data and provide the confidence information with the data to the message-generating apparatus for generating the V2X message.

8. A vehicle comprising the device according to claim 1.

9. A device for vehicle-to-X (V2X) communication, comprising:
   a computing apparatus; and
   a generating apparatus for generating vehicle-to-X messages by a protocol stack,
   wherein the computing apparatus is configured to:
      predict an occurrence of an anticipated event that will trigger the broadcasting of data via a V2X message,
      in response to the prediction, and prior to the anticipated event occurring, provide the data to the generating apparatus, and
      sign the V2X message by a signing apparatus and then to not broadcast the V2X message if the anticipated event does not actually occur and/or to broadcast the V2X message only when the anticipated event actually occurs.

10. The device according to claim 9, configured not to sign the V2X message by the signing apparatus if the anticipated event does not actually occur and/or to sign the V2X message by the signing apparatus only when the anticipated event actually occurs.

11. A method for vehicle-to-X (V2X) communication, including a computing apparatus and a generating apparatus for generating vehicle-to-X messages by a protocol stack, the method comprising:
   predicting, by the computing apparatus, an occurrence of an anticipated event that will trigger the broadcasting of data via a V2X message;
   in response to the prediction, and prior to the anticipated event occurring, providing, by the computing apparatus, the data to the generating apparatus; and
   not broadcasting the V2X message if the anticipated event does not actually occur and/or broadcasting the V2X message only when the anticipated event actually occurs.

* * * * *